(12) United States Patent
Kataoka et al.

(10) Patent No.: US 6,322,510 B1
(45) Date of Patent: Nov. 27, 2001

(54) ULTRASONIC IMAGING METHOD AND APPARATUS

(75) Inventors: Hiroaki Kataoka; Yoichi Suzuki, both of Tokyo (JP)

(73) Assignee: GE Yokogawa Medical Systems, Limited, Tokyo (JP)

(*) Notice: Subject to any disclaimer, the term of this patent is extended or adjusted under 35 U.S.C. 154(b) by 0 days.

(21) Appl. No.: 09/399,276

(22) Filed: Sep. 17, 1999

(30) Foreign Application Priority Data

Nov. 18, 1998 (JP) .................................................. 10-328150

(51) Int. Cl.[7] ....................................................... A61B 8/12
(52) U.S. Cl. ............................................. 600/453; 600/455
(58) Field of Search ........................... 600/437, 440–447, 600/453–455; 73/619, 621, 204.14, 861.25

(56) References Cited

U.S. PATENT DOCUMENTS

| 4,141,347 | * | 2/1979 | Green et al. | ...................... 600/441 |
| 5,348,013 | * | 9/1994 | Kanda et al. | ...................... 600/443 |
| 5,910,119 | * | 6/1999 | Lin | ...................... 600/455 |
| 6,023,968 | * | 2/2000 | Spratt et al. | ...................... 73/204.14 |

* cited by examiner

*Primary Examiner*—Marvin M. Lateef
*Assistant Examiner*—Ali M. Imam
(74) *Attorney, Agent, or Firm*—Moonray Kojima

(57) ABSTRACT

In order to capture an image representing pulsation strength in moving velocity of an echo source, a moving velocity V of the echo source is detected based on the Doppler shift in an ultrasonic echo, and a pulsation strength P in the moving velocity V is detected at a pulsation detecting means 132 by a calculation that employs a value $V_n$ of the moving velocity V at a current time phase and a value $V_o$ of the moving velocity V at a past time phase.

21 Claims, 12 Drawing Sheets

ULTRASONIC IMAGING METHOD AND APPARATUS

BACKGROUND OF THE INVENTION

The present invention relates to an ultrasonic imaging method and apparatus, and more particularly to an ultrasonic imaging method and apparatus for capturing an image representing pulsation strength in moving velocity of an echo source within a subject using the Doppler shift in ultrasonic echoes.

In ultrasonic imaging, the Doppler shift in ultrasonic echoes is used to capture a blood flow image. The blood flow image is displayed as a CFM (color flow mapping) image that represents two-dimensional distribution of the blood flow rate or as a power Doppler image that represents locations of blood flows. Based on the blood flow image of an ROI (region of interest), an oncologic diagnosis, for example, is made. When the oncologic diagnosis or the like is made based on the blood flow image, the important key for the diagnosis is whether the blood flow of interest is arterial or venous.

The CFM image and the power Doppler image however have a problem that as these images cannot detect a pulsation property of the blood flow it is difficult to decide whether the blood flow is arterial or venous. Therefore, in order to study the pulsation property, Doppler signals at a point of interest must be sampled again by, for example, a point Doppler technique to observe a spectrum thereof or to listen to Doppler sound.

SUMMARY OF THE INVENTION

It is therefore an object of the invention to provide an ultrasonic imaging method and apparatus for capturing an image representing pulsation strength in moving velocity of an echo source.

(1) In accordance with a first aspect of the present invention, there is provided an ultrasonic imaging method comprising the steps of: repeatedly scanning an imaging range with an ultrasound and receiving an echo; detecting a moving velocity of an echo source based on the Doppler shift in the received echo and detecting a pulsation strength in the moving velocity by a calculation that employs a value of the moving velocity at a current time phase and a value of the moving velocity at a past time phase; and producing an image representing the detected pulsation strength.

In the invention as described regarding the first aspect, it is preferred that the calculation be performed employing a difference value between the value of the moving velocity at the current time phase and the value of the moving velocity at the past time phase in that the pulsation strength is suitably detected.

Moreover, in the invention as described regarding the first aspect, it is preferred that the calculation be performed employing an average value of the value of the moving velocity at the current time phase and the value of the moving velocity at the past time phase in that the pulsation strength is suitably detected.

(2) In accordance with a second aspect of the present invention, there is provided an ultrasonic imaging method comprising the steps of: repeatedly scanning an imaging range with an ultrasound and receiving an echo; detecting a moving velocity of an echo source based on the Doppler shift in the received echo and detecting a pulsation strength in the moving velocity by a calculation that employs a value of the moving velocity at a current time phase and an average value for the moving velocity values from a past time phase to the current time phase; and producing an image representing the detected pulsation strength.

In the invention as described regarding the first or second aspect, it is preferred that a variance of the moving velocity be detected and the calculation be performed employing the detected variance in that the pulsation strength is suitably detected.

Moreover, in the invention as described regarding the first or second aspect, it is preferred that the result of the calculation in a specific time period in a pulsation cycle of the heart be output in that the pulsation strength is suitably detected.

Furthermore, in the invention as described regarding the first or second aspect, it is preferred that an electrocardiographic (ECG) signal of an imaging subject be detected and the specific time period be defined based on the ECG signal in that the pulsation strength is suitably detected.

In addition, in the invention as described regarding the first or second aspect, it is preferred that an average velocity value for the moving velocity through a pulsation cycle(s) of the heart be determined, a difference value between the value of the moving velocity at the current time phase and the value of the moving velocity at the past time phase be determined, and the pulsation strength in the moving velocity be detected by a calculation that employs the average velocity value and the difference value in that the pulsation strength is suitably detected.

In addition, in the invention as described regarding the first or second aspect, it is preferred that an average velocity value for the moving velocity through a pulsation cycle(s) of the heart be determined, a difference value between the value of the moving velocity at the current time phase and the value of the moving velocity at the past time phase be determined, an average difference value for the difference value through a pulsation cycle(s) of the heart be determined, and the pulsation strength in the moving velocity be detected by a calculation that employs the average velocity value and the average difference value in that the pulsation strength is suitably detected.

In addition, in the invention as described regarding the first or second aspect, it is preferred that a variance of the moving velocity be detected, an average variance value for the detected variance through a pulsation cycle(s) of the heart be determined, and the calculation be performed employing the average variance value in that the pulsation strength is suitably detected.

In addition, in the invention as described regarding the first or second aspect, it is preferred that a maximum velocity value for the moving velocity through a pulsation cycle(s) of the heart be determined, a difference value between the value of the moving velocity at the current time phase and the value of the moving velocity at the past time phase be determined, and the pulsation strength in the moving velocity be detected by a calculation that employs the maximum velocity value and the difference value in that the pulsation strength is suitably detected.

In addition, in the invention as described regarding the first or second aspect, it is preferred that a maximum velocity value for the moving velocity through a pulsation cycle(s) of the heart be determined, a difference value between the value of the moving velocity at the current time phase and the value of the moving velocity at the past time phase be determined, a maximum difference value for the difference value through a pulsation cycle(s) of the heart be determined, and the pulsation strength in the moving velocity be detected by a calculation that employs the maximum velocity value and the maximum difference value in that the pulsation strength is suitably detected.

In addition, in the invention as described regarding the first or second aspect, it is preferred that a variance of the moving velocity be detected, a maximum variance value for the variance through a pulsation cycle(s) of the heart be determined, and the calculation be performed employing the maximum variance value in that the pulsation strength is suitably detected.

In addition, in the invention as described regarding the first or second aspect, it is preferred that an ECG signal of an imaging object be detected, and the pulsation cycle be determined based on the ECG signal in that the pulsation strength is suitably detected.

In addition, in the invention as described regarding the first or second aspect, it is preferred that the pulsation cycle be determined based on periodic change in the Doppler shift in that the pulsation strength is suitably detected.

In addition, in the invention as described regarding the first or second aspect, it is preferred that the pulsation cycle be determined based on periodic change in the pulsation strength in that the pulsation strength is suitably detected.

In addition, in the invention as described regarding the first or second aspect, it is preferred that the calculation be performed employing an output signal at the past time phase in that the pulsation strength is suitably detected.

In addition, in the invention as described regarding the first or second aspect, it is preferred that an image be produced based on an instantaneous value of the pulsation strength in that the pulsation strength is suitably displayed.

In addition, in the invention as described regarding the first or second aspect, it is preferred that an image be produced based on a temporal average value of the pulsation strength in that the pulsation strength is suitably displayed.

In addition, in the invention as described regarding the first or second aspect, it is preferred that an image be produced based on a peak-hold value of the pulsation strength in that the pulsation strength is suitably displayed.

In addition, in the invention as described regarding the first or second aspect, it is preferred that a B-mode image be produced based on the received echo and the B-mode image and the image representing the pulsation strength be superimposed in that the pulsation strength is suitably displayed.

In addition, in the invention as described regarding the first or second aspect, it is preferred that an image representing the moving velocity be produced and the velocity image and the image representing the pulsation strength be superimposed in that the pulsation strength is suitably displayed.

In addition, in the invention as described regarding the first or second aspect, it is preferred that a power Doppler image representing a power of the Doppler shift signal be produced and the power Doppler image and the image representing the pulsation strength be superimposed in that the pulsation strength is suitably displayed.

In addition, in the invention as described regarding the first or second aspect, it is preferred that the image be displayed as a three-dimensional image in that the pulsation strength is suitably displayed.

(3) In accordance with a third aspect of the present invention, there is provided an ultrasonic imaging apparatus comprising: ultrasound transmitting/receiving means for repeatedly scanning an imaging range with an ultrasound and receiving an echo; velocity detecting means for detecting a moving velocity of an echo source based on the Doppler shift in the received echo; pulsation detecting means for detecting a pulsation strength in the moving velocity by a calculation that employs a value of the moving velocity at a current time phase and a value of the moving velocity at a past time phase; and image producing means for producing an image representing the detected pulsation strength.

(4) In accordance with a fourth aspect of the present invention, there is provided the ultrasonic imaging apparatus as described in (3), wherein: the pulsation detecting means performs the calculation employing a difference value between the value of the moving velocity at the current time phase and the value of the moving velocity at the past time phase.

(5) In accordance with a fifth aspect of the present invention, there is provided the ultrasonic imaging apparatus as described in (3) or (4), wherein: the pulsation detecting means performs the calculation employing an average value of the value of the moving velocity at the current time phase and the value of the moving velocity at the past time phase.

(6) In accordance with a sixth aspect of the present invention, there is provided an ultrasonic imaging apparatus comprising: ultrasound transmitting/receiving means for repeatedly scanning an imaging range with an ultrasound and receiving an echo; velocity detecting means for detecting a moving velocity of an echo source based on the Doppler shift in the received echo; pulsation detecting means for detecting a pulsation strength in the moving velocity by a calculation that employs a value of the moving velocity at a current time phase and an average value for the movement velocity from a past time phase to the current time phase; and image producing means for producing an image representing the detected pulsation strength.

(7) In accordance with a seventh aspect of the present invention, there is provided the ultrasonic imaging apparatus as described in any one of (3) through (6), comprising: variance detecting means for detecting a variance of the moving velocity, wherein: the pulsation detecting means performs the calculation employing the variance detected by the variance detecting means.

(8) In accordance with an eighth aspect of the present invention, there is provided the ultrasonic imaging apparatus as described in any one of (3) through (7), wherein: the pulsation detecting means outputs the result of the calculation in a specific time period in a pulsation cycle of the heart.

(9) In accordance with a ninth aspect of the present invention, there is provided the ultrasonic imaging apparatus as described in (8), comprising: electrocardiographic (ECG) signal detecting means for detecting an ECG signal of an imaging object, wherein: the pulsation detecting means defines the specific time period based on the detected ECG signal.

(10) In accordance with a tenth aspect of the present invention, there is provided an ultrasonic imaging apparatus comprising: ultrasound transmitting/receiving means for repeatedly scanning an imaging range with an ultrasound and receiving an echo; velocity detecting means for detecting a moving velocity of an echo source based on the Doppler shift in the received echo; velocity averaging means for determining an average velocity value for the moving velocity through a pulsation cycle(s) of the heart; difference generating means for determining a difference value between a value of the moving velocity at a current time phase and a value of the moving velocity at a past time phase; pulsation detecting means for detecting a pulsation strength in the moving velocity by a calculation that employs the average velocity value and the difference value; and image producing means for producing an image representing the detected pulsation strength.

(11) In accordance with an eleventh aspect of the present invention, there is provided an ultrasonic imaging apparatus comprising: ultrasound transmitting/receiving means for repeatedly scanning an imaging range with an ultrasound and receiving an echo; velocity detecting means for detecting a moving velocity of an echo source based on the Doppler shift in the received echo; velocity averaging means for determining an average velocity value for the moving velocity through a pulsation cycle(s) of the heart; difference generating means for determining a difference value between a value of the moving velocity at a current time phase and a value of the moving velocity at a past time phase; difference averaging means for determining an average difference value for the difference value through a pulsation cycle(s) of the heart; pulsation detecting means for detecting a pulsation strength in the moving velocity by a calculation that employs the average velocity value and the average difference value; and image producing means for producing an image representing the detected pulsation strength.

(12) In accordance with a twelfth aspect of the present invention, there is provided the ultrasonic imaging apparatus as described in (10) or (11), comprising: variance detecting means for detecting a variance of the moving velocity; and variance averaging means for determining an average variance value for the variance through a pulsation cycle(s) of the heart, wherein: the pulsation detecting means performs the calculation employing the average variance value.

(13) In accordance with a thirteenth aspect of the present invention, there is provided the ultrasonic imaging apparatus as described in any one of (10) through (12), wherein: the pulsation detecting means performs the calculation employing a value of the moving velocity at the current time phase.

(14) In accordance with a fourteenth aspect of the present invention, there is provided the ultrasonic imaging apparatus as described in any one of (11) through (13), wherein: the pulsation detecting means performs the calculation employing a value of the difference value at the current time phase.

(15) In accordance with a fifteenth aspect of the present invention, there is provided the ultrasonic imaging apparatus as described in any one of (12) through (14), wherein: the pulsation detecting means performs the calculation employing a value of the variance at the current time phase.

(16) In accordance with a sixteenth aspect of the present invention, there is provided an ultrasonic imaging apparatus comprising: ultrasound transmitting/receiving means for repeatedly scanning an imaging range with an ultrasound and receiving an echo; velocity detecting means for detecting a moving velocity of an echo source based on the Doppler shift in the received echo; maximum velocity detecting means for determining a maximum velocity value for the moving velocity through a pulsation cycle(s) of the heart; difference generating means for determining a difference value between a value of the moving velocity at a current time phase and a value of the moving velocity at a past time phase; pulsation detecting means for detecting a pulsation strength in the moving velocity by a calculation that employs the maximum velocity value and the difference value; and image producing means for producing an image representing the detected pulsation strength.

(17) In accordance with a seventeenth aspect of the present invention, there is provided an ultrasonic imaging apparatus comprising: ultrasound transmitting/receiving means for repeatedly scanning an imaging range with an ultrasound and receiving an echo; velocity detecting means for detecting a moving velocity of an echo source based on the Doppler shift in the received echo; maximum velocity detecting means for determining a maximum velocity value for the moving velocity through a pulsation cycle(s) of the heart; difference generating means for determining a difference value between a value of the moving velocity at a current time phase and a value of the moving velocity at a past time phase; maximum difference detecting means for determining a maximum difference value for the difference value through a pulsation cycle(s) of the heart; pulsation detecting means for detecting a pulsation strength in the moving velocity by a calculation that employs the maximum velocity value and the maximum difference value; and image producing means for producing an image representing the detected pulsation strength.

(18) In accordance with an eighteenth aspect of the present invention, there is provided the ultrasonic imaging apparatus as described in (16) or (17), comprising: variance detecting means for detecting a variance of the moving velocity; and maximum variance detecting means for determining a maximum variance value for the variance through a pulsation cycle(s) of the heart, wherein: the pulsation detecting means performs the calculation employing the maximum variance.

(19) In accordance with a nineteenth aspect of the present invention, there is provided the ultrasonic imaging apparatus as described in any one of (16) through (18), wherein: the pulsation detecting means performs the calculation employing a value of the moving velocity at the current time phase.

(20) In accordance with a twentieth aspect of the present invention, there is provided the ultrasonic imaging apparatus as described in any one of (17) through (19), wherein: the pulsation detecting means performs the calculation employing a value of the difference value at the current time phase.

(21) In accordance with a twenty-first aspect of the present invention, there is provided the ultrasonic imaging apparatus as described in any one of (18) through (20), wherein: the pulsation detecting means performs the calculation employing a value of the variance at the current time phase.

(22) In accordance with a twenty-second aspect of the present invention, there is provided the ultrasonic imaging apparatus as described in any one of (10) through (21), comprising: an electrocardiographic (ECG) signal detecting means for detecting an ECG signal of an imaging object, wherein: the pulsation detecting means determines the pulsation cycle based on the ECG signal.

(23) In accordance with a twenty-third aspect of the present invention, there is provided the ultrasonic imaging apparatus as described in any one of (10) through (21), wherein: the pulsation detecting means determines the pulsation cycle based on periodic change in the Doppler shift.

(24) In accordance with a twenty-fourth aspect of the present invention, there is provided the ultrasonic imaging apparatus as described in any one of (10) through (21), wherein: the pulsation detecting means determines the pulsation cycle based on periodic change in the pulsation strength detected by itself.

(25) In accordance with a twenty-fifth aspect of the present invention, there is provided the ultrasonic imaging apparatus as described in any one of (3) through (24), wherein: the pulsation detecting means performs the calculation employing an output signal at the past time phase output by itself.

(26) In accordance with a twenty-sixth aspect of the present invention, there is provided the ultrasonic imaging apparatus as described in any one of (3) through (25), wherein: the image producing means produces an image based on an instantaneous value of the pulsation strength.

(27) In accordance with a twenty-seventh aspect of the present invention, there is provided the ultrasonic imaging apparatus as described in any one of (3) through (25), wherein: the image producing means produces an image based on a temporal average value of the pulsation strength.

(28) In accordance with a twenty-eighth aspect of the present invention, there is provided the ultrasonic imaging apparatus as described in any one of (3) through (25), wherein: the image producing means produces an image based on a peak-hold value of the pulsation strength.

(29) In accordance with a twenty-ninth aspect of the present invention, there is provided the ultrasonic imaging apparatus as described in any one of (3) through (28), comprising: display means for displaying the image representing the pulsation strength as a three-dimensional image.

(30) In accordance with a thirtieth aspect of the present invention, there is provided the ultrasonic imaging apparatus as described in any one of (3) through (28), comprising: B-mode image producing means for producing a B-mode image based on the received echo; and display means for superimposing the B-mode image and the image representing the pulsation strength.

(31) In accordance with a thirty-first aspect of the present invention, there is provided the ultrasonic imaging apparatus as described in any one of (3) through (28), comprising: velocity image producing means for producing an image representing the moving velocity; and display means for superimposing the velocity image and the image representing the pulsation strength.

(32) In accordance with a thirty-second aspect of the present invention, there is provided the ultrasonic imaging apparatus as described in any one of (3) through (28), comprising: power Doppler image producing means for producing a power Doppler image representing a power of the Doppler shift signal; and display means for superimposing the power Doppler image and the image representing the pulsation strength.

(33) In accordance with a thirty-third aspect of the present invention, there is provided the ultrasonic imaging apparatus as described in any one of (30) through (32), wherein: the display means displays the image as a three-dimensional image.

(OPERATION)

In accordance with the present invention, pulsation strength in moving velocity of an echo source is detected by a calculation that employs a value of the moving velocity at a current time phase and a value of the moving velocity at a past time phase as determined from the Doppler shift in an ultrasonic echo, and an image representing the pulsation strength is produced.

Therefore, the present invention can implement an ultrasonic imaging method and apparatus for capturing an image representing pulsation strength in moving velocity of an echo source.

Further objects and advantages of the present invention will be apparent from the following description of the preferred embodiments of the invention as illustrated in the accompanying drawings.

DETAILED DESCRIPTION OF THE DRAWINGS

Figure 1:
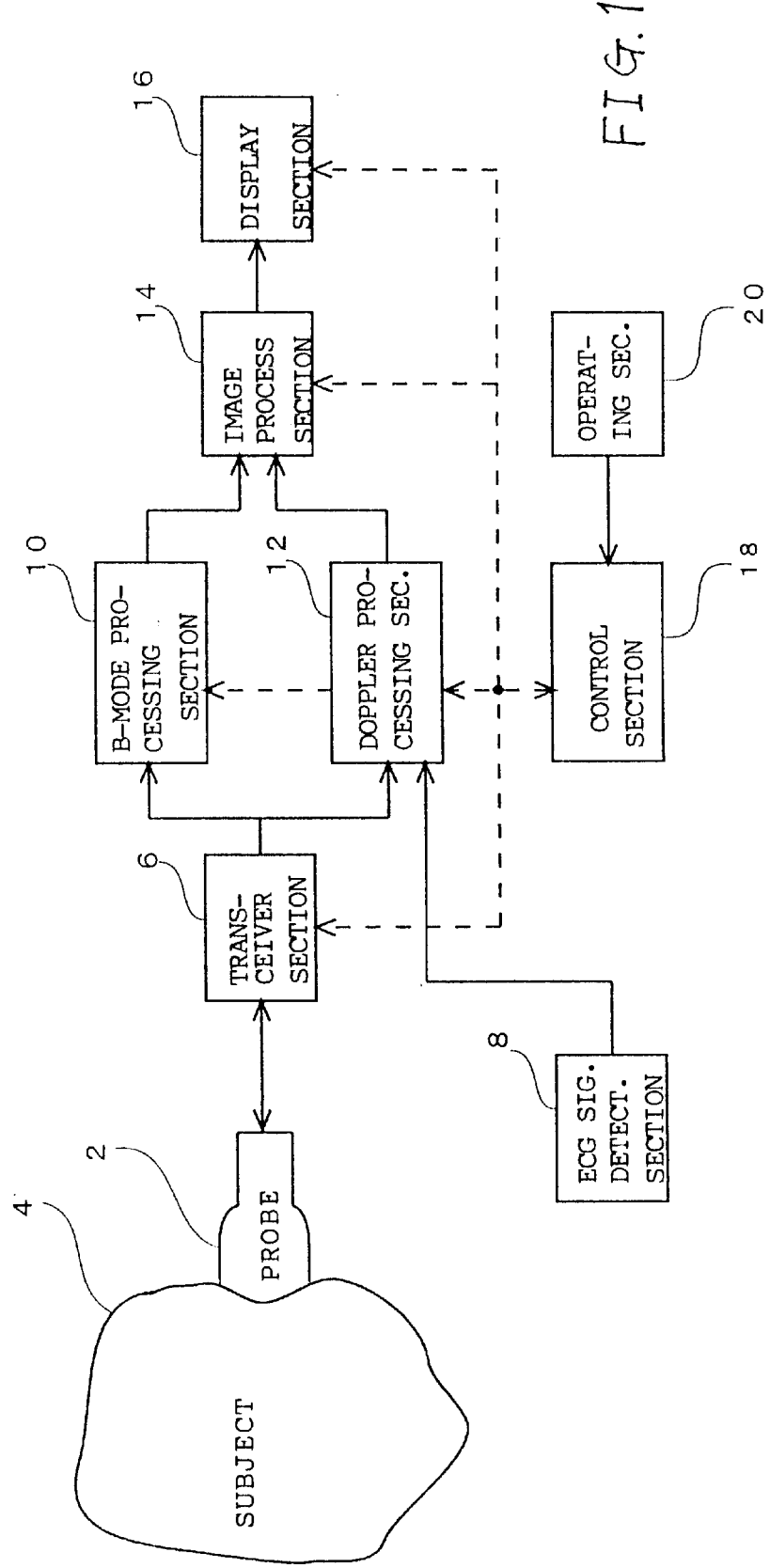
FIG. 1 is a block diagram of an apparatus in accordance with one embodiment of the present invention.

The embodiments of the present invention will now be described in more detail with reference to the accompanying drawings. FIG. 1 shows a block diagram of an ultrasonic imaging apparatus that is one embodiment of the present invention. The configuration of the apparatus represents an embodiment of the apparatus in accordance with the present invention, and the operation of the apparatus represents an embodiment of the method in accordance with the present invention.

As shown in FIG. 1, the present apparatus has an ultrasonic probe 2. The ultrasonic probe 2 has an array of a plurality of ultrasonic transducers (not shown). The individual ultrasonic transducers are composed of a piezoelectric material such as PZT (lead zirconate titanate) ceramic. The ultrasonic probe 2 is used by a human operator abutting the probe 2 against a subject 4.

The ultrasonic probe 2 is connected to a transceiver section 6. The transceiver section 6 supplies a drive signal to the ultrasonic probe 2 to transmit an ultrasound. The transceiver section 6 also receives an echo signal picked up by the ultrasonic probe 2.

Figure 2:
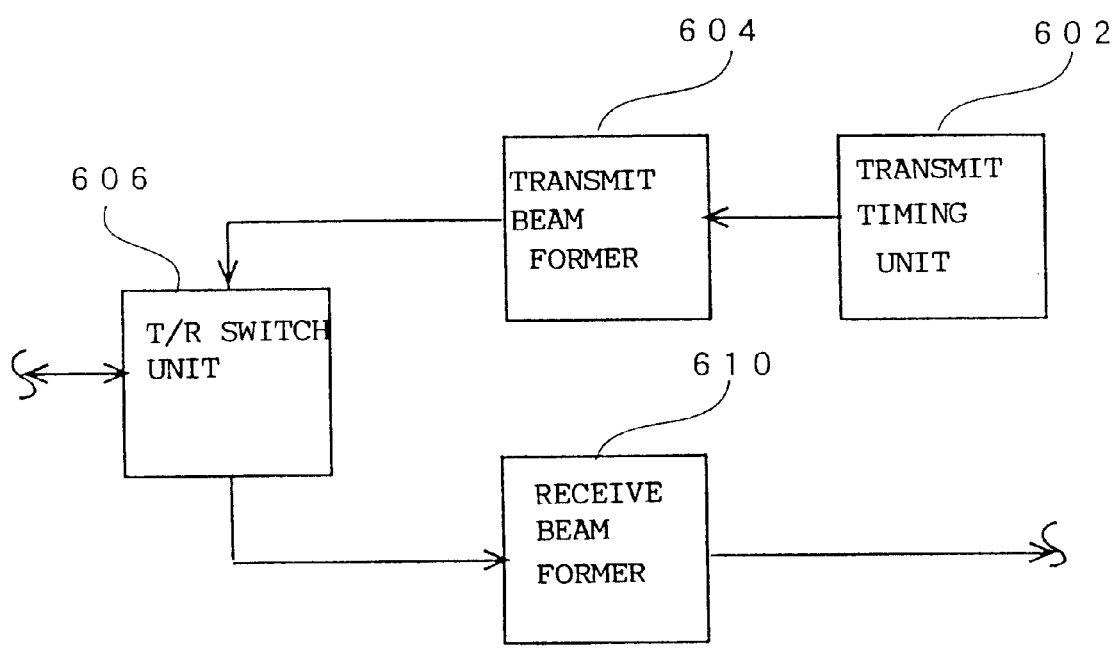
FIG. 2 is a block diagram of the transceiver section in the apparatus shown in FIG. 1.

FIG. 2 shows a block diagram of the transceiver section 6. As shown, the transceiver section 6 has a transmit timing generating unit 602. The transmit timing generating unit 602 periodically generates a transmit timing signal and inputs the signal to a transmit beamformer 604.

The transmit beamformer 604 is for performing beamforming for transmitted waves, and generates a beamforming signal for forming an ultrasonic beam in a predetermined direction based on the transmit timing signal. The beamforming signal is comprised of a plurality of drive signals, each of which is given a time difference corresponding to the direction. The transmit beamformer 604 inputs the transmit beamforming signal to a transmit/receive (T/R) switching unit 606.

The T/R switching unit 606 inputs the beamforming signal to the ultrasonic transducer array. A plurality of ultrasonic transducers of the ultrasonic transducer array that constitute a transmit aperture each generate ultrasounds having phase differences corresponding to the time differences of the drive signals. By synthesizing the wavefronts of the ultrasounds, an ultrasonic beam along an acoustic line in a predetermined direction is generated.

The T/R switching unit 606 is connected with a receive beamformer 610. The T/R switching unit 606 supplies a plurality of echo signals picked up by a receive aperture in the ultrasonic transducer array into the receive beamformer 610. The receive beamformer 610 is for performing beamforming for received waves corresponding to the transmit acoustic line, and gives time differences to a plurality of received echoes to regulate their phases and then sums the echoes to generate an echo receive signal along an acoustic line in the predetermined direction.

Figure 3:
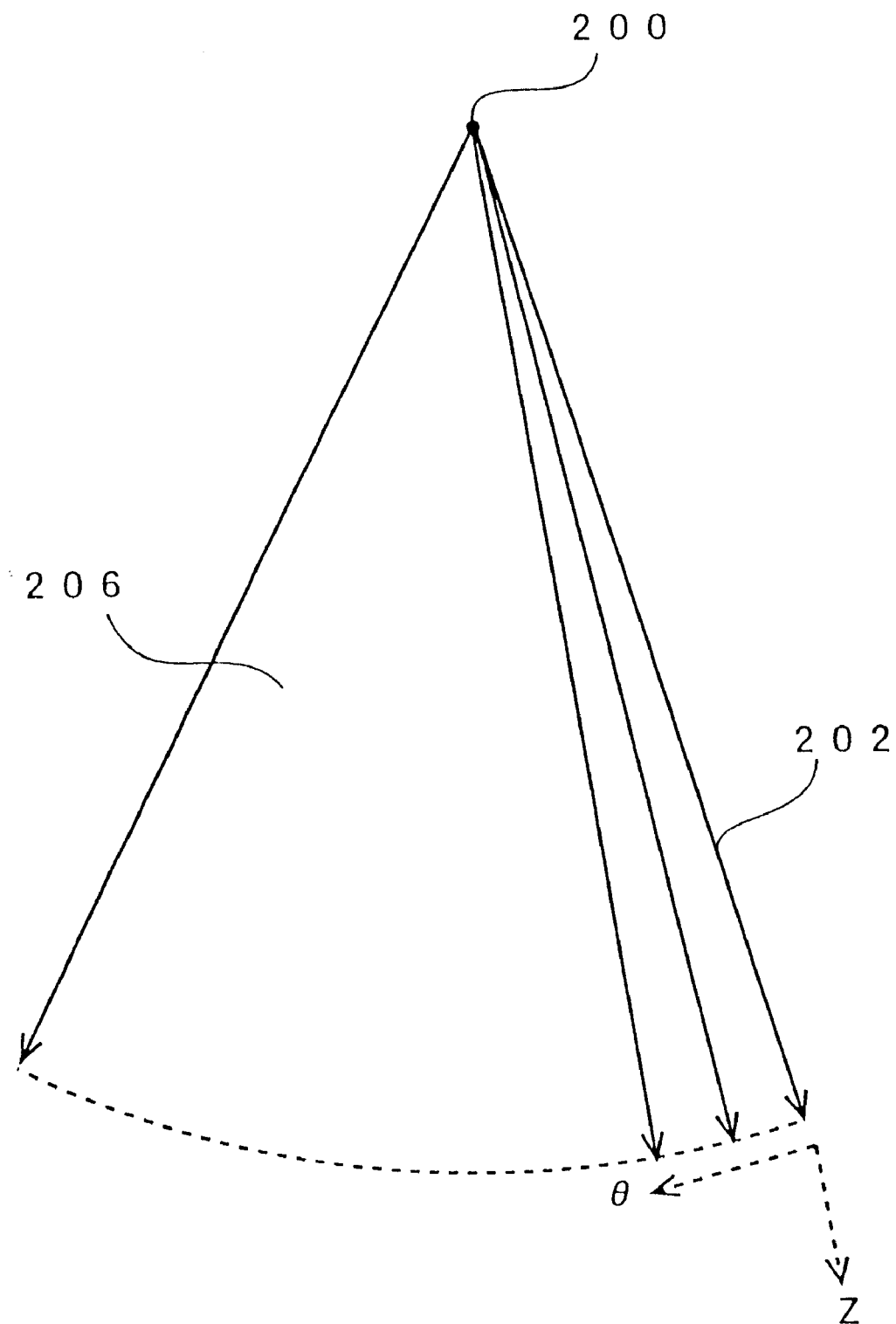
FIG. 3 is a schematic diagram of acoustic line scan by the apparatus shown in FIG. 1.

The transmission of the ultrasonic beam is repeated at predetermined time intervals in response to the transmit timing signal generated by the transmit timing generating unit 602. The transmit beamformer 604 and the receive beamformer 610 alter the direction of the acoustic line by a specified amount synchronously with the repetition. Thus, the internal of the subject 4 is sequentially scanned by the acoustic line. The transceiver section 6 thus configured performs a scan as exemplarily shown in FIG. 3. That is, a fan-shaped two-dimensional region 206 is scanned in the θ-direction by an acoustic line 202 that extends from a radiant point 200 in the z-direction to execute a so-called sector scan.

Figure 4:
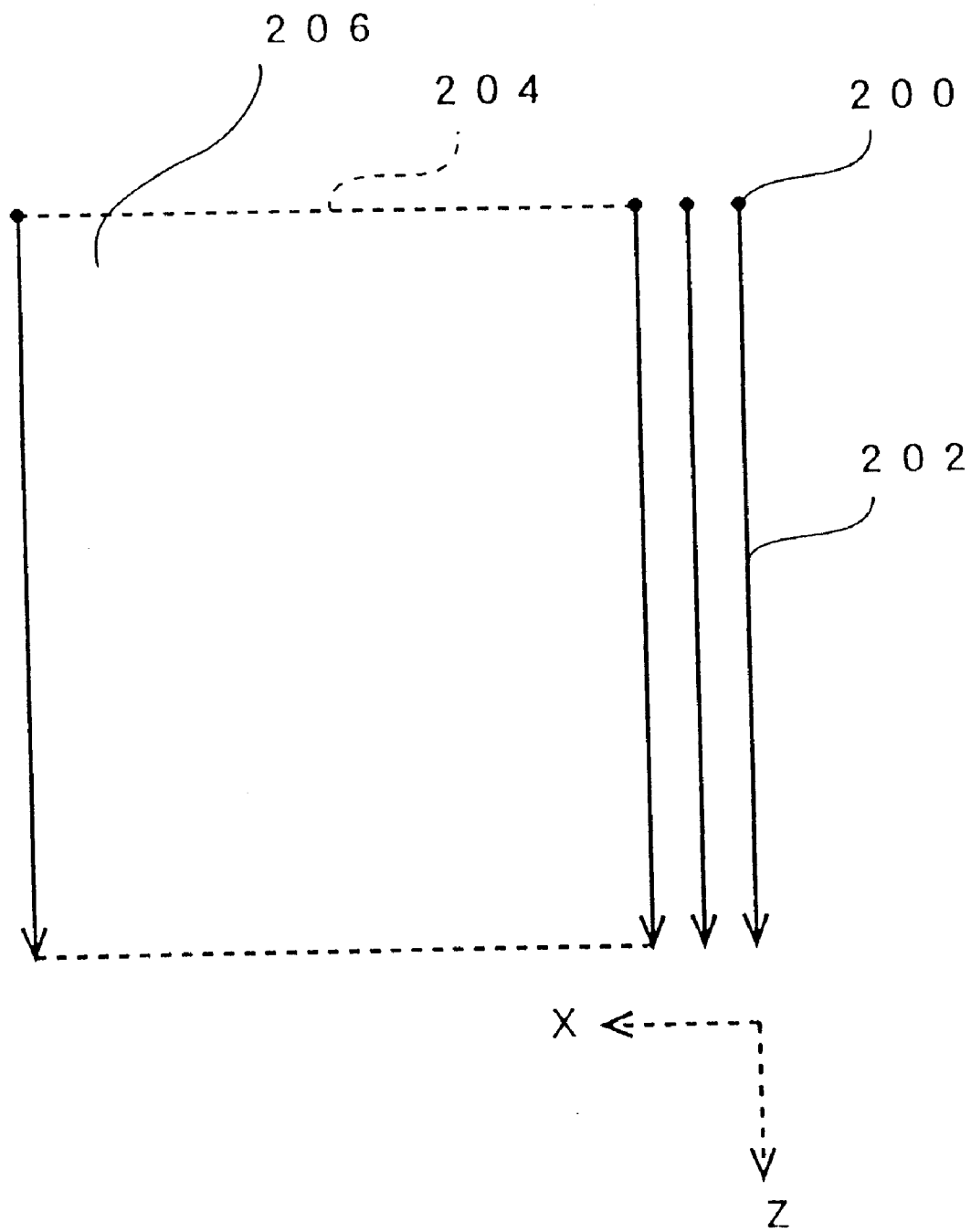
FIG. 4 is a schematic diagram of acoustic line scan by the apparatus shown in FIG. 1.

When the transmit and receive apertures are formed using part of the ultrasonic transducer array, a scan as exemplarily shown in FIG. 4 can be performed by sequentially shifting the apertures along the array. That is, a rectangular two-dimensional region 206 is scanned in the x-direction by translating an acoustic line 202, which emanates from a radiant point 200 in the z-direction, along a linear trajectory 204 to execute a so-called linear scan.

Figure 5:
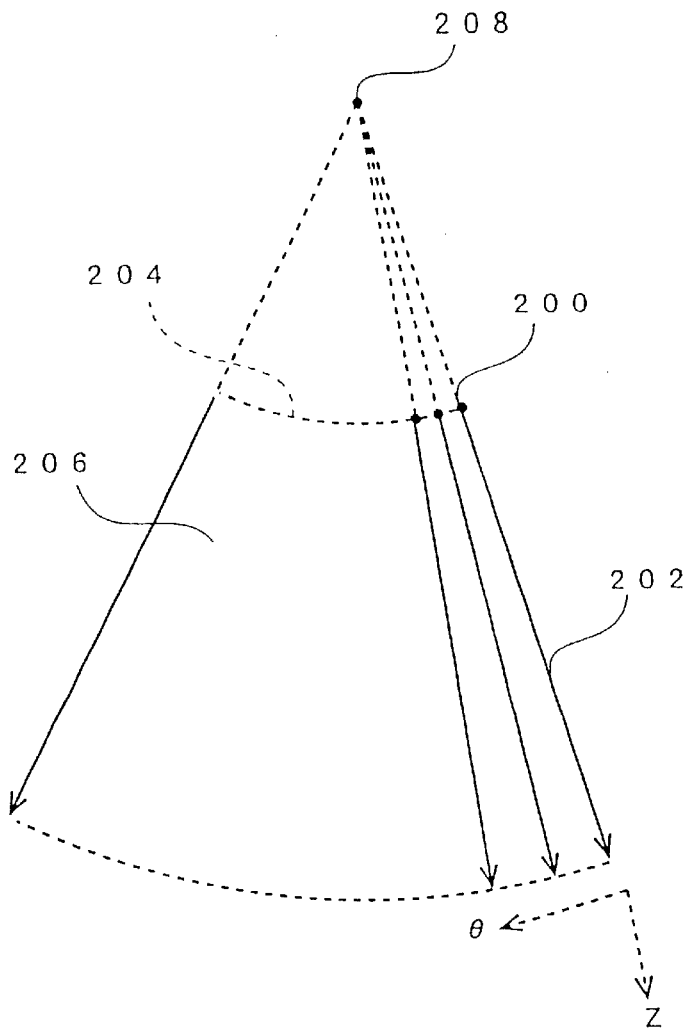
FIG. 5 is a schematic diagram of acoustic line scan by the apparatus shown in FIG. 1.

It will be recognized that when the ultrasonic transducer array is a so-called convex array, which is formed along an arc protruding toward the ultrasound transmitting direction, a partial fan-shaped two-dimensional region 206 can be scanned by performing an acoustic line scan similar to the linear scan in the θ-direction and moving a radiant point 200 of an acoustic line 202 along an arc-like trajectory 204 to execute a so-called convex scan, as exemplarily shown in FIG. 5.

The transceiver section 6 is connected to a B-mode processing section 10 and a Doppler processing section 12. The echo receive signal for each acoustic line output from the transceiver section 6 is input to the B-mode processing section 10 and the Doppler processing section 12. The Doppler processing section 12 is connected with an ECG (electrocardiographic) signal detecting section 8 and is supplied with an ECG signal of the subject 4.

Figure 6:
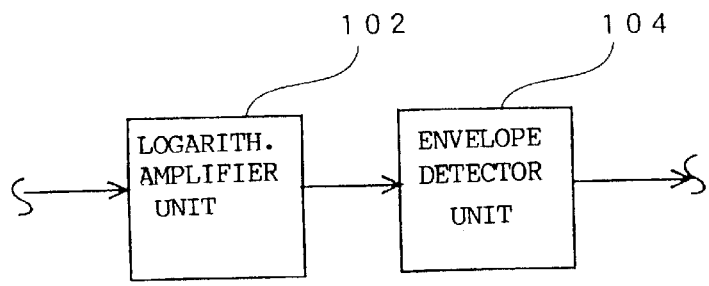
FIG. 6 is a block diagram of the B-mode processing section in the apparatus shown in FIG. 1.

The B-mode processing section 10 is for generating B-mode image data. The B-mode processing section 10 comprises a logarithmic amplifier unit 102 and an envelope detector unit 104, as shown in FIG. 6. The B-mode processing section 10 logarithmically amplifies the echo receive signal at the logarithmic amplifier unit 102, detects an envelope at the envelope detector section 104 to obtain a signal that represents the strength values of the echoes at the individual reflection points on an acoustic line, i.e., an A-scope signal, and generates the B-mode image data in which an instantaneous amplitude value of the A-scope signal corresponds to a brightness value.

Figure 7:
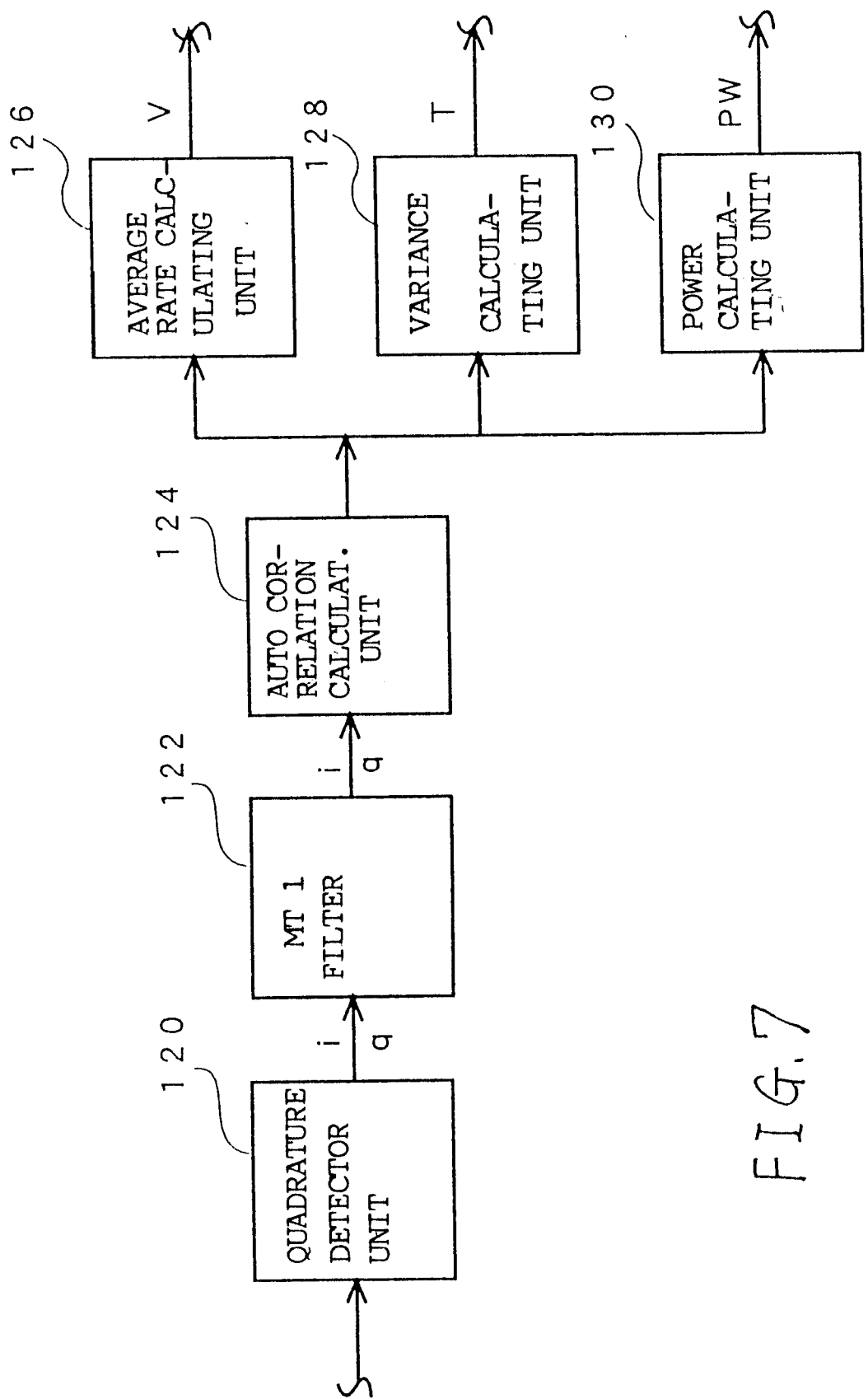
FIG. 7 is a block diagram of part of the Doppler processing section in the apparatus shown in FIG. 1.

The Doppler processing section 12 is for generating Doppler image data. The Doppler image data involves velocity data, variance data, power data and pulsation strength data, which will be described later. As shown in FIG. 7, the Doppler processing section 12 comprises a quadrature detector unit 120, an MTI (moving target indication) filter 122, an autocorrelation calculating unit 124, an average flow rate calculating unit 126, a variance calculating unit 128 and a power calculating unit 130.

The Doppler processing section 12 quadrature-detects the echo receive signal at the quadrature detector unit 120 and MTI-processes the signal at the MTI filter 122 to determine a Doppler shift in the echo signal. The Doppler processing section 12 also performs an autocorrelation calculation on the output signal from the MTI filter 122 at the autocorrelation calculating unit 124, and determines an average flow rate V from the result of the autocorrelation calculation at the average flow rate calculating unit 126, a variance T of the flow rate from the result of the autocorrelation calculation at the variance calculating unit 128, and a power PW of the Doppler signal from the result of the autocorrelation calculation at the power calculating unit 130.

Thus, one can obtain respective data that represent the average flow rate V, the variance T thereof and the power PW of the Doppler signal of an echo source moving within the subject 4, such as blood, for each acoustic line. These image data indicate the average flow rate, the variance and the power at each point on the acoustic line (i.e., at each pixel). The average flow rate will be referred to simply as a velocity hereinafter. The velocity is obtained as a component in the acoustic line direction. Moreover, the direction toward the ultrasonic probe 2 and the direction away from the ultrasonic probe 2 are discriminated. The echo source is not limited to blood but may be, for example, a microballoon contrast agent injected into the blood vessel or the like. While reference will be made in the following description to an example of blood, the present invention applies to the microballoon contrast agent or the like in a similar manner.

Figure 8:
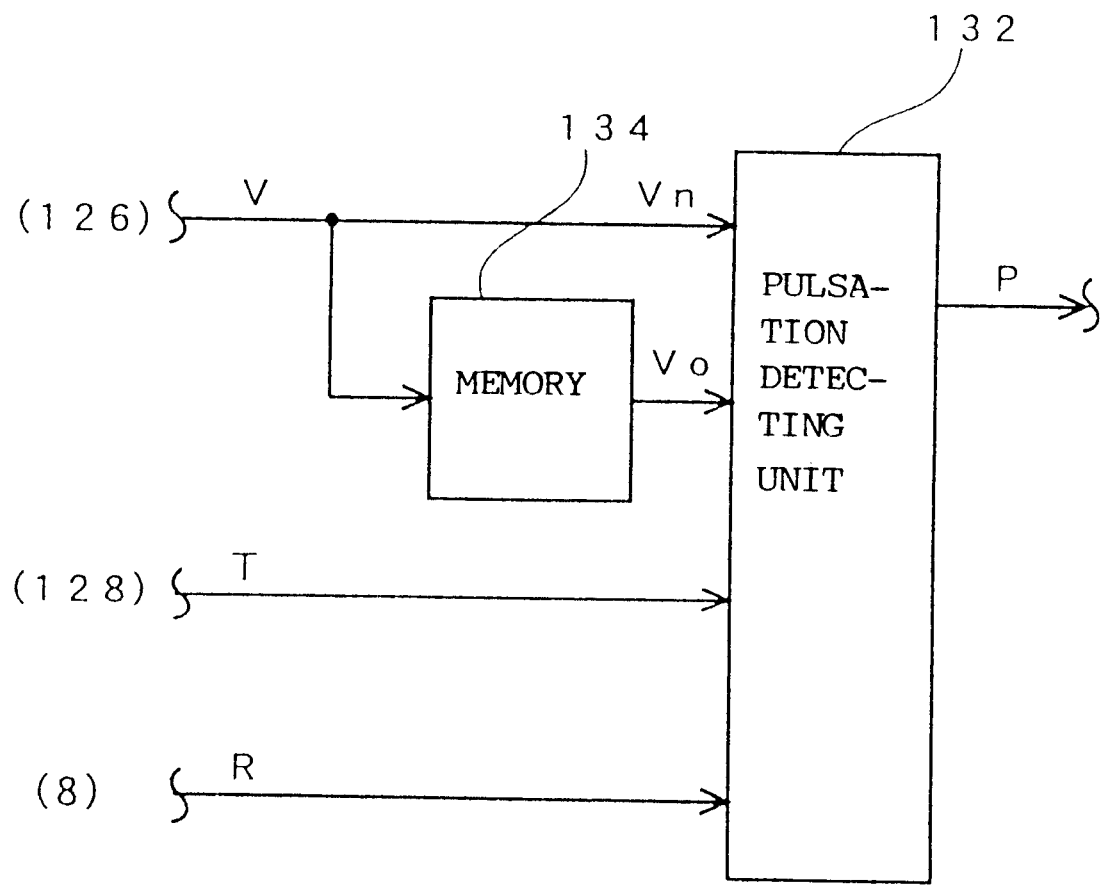
FIG. 8 is a block diagram of part of the Doppler processing section in the apparatus shown in FIG. 1.

The Doppler processing section 12 also has a pulsation detecting unit 132 and a memory 134 as shown in FIG. 8. The pulsation detecting unit 132 is made of a DSP (digital signal processor) and a MPU (micro processing unit), for example.

The pulsation detecting unit 132 and the memory 134 are supplied with output data from the average flow rate calculating unit 126, i.e., the velocity V, for each pixel. Moreover, the pulsation detecting unit 132 is supplied with the variance T from the variance calculating unit 128 for each pixel, and an R-wave timing signal R of the ECG signal from the ECG detector section 8.

The memory 134 stores the input velocity data V for one frame of the acoustic line scan. Of the stored velocity data, data for the same pixel as the pixel of the input velocity data V but of a frame that precedes by one is read out and input to the pulsation detecting unit 132. Thus, the velocity data V is input to the pulsation detecting unit 132 via the memory 134 with a delay of one frame.

The memory 134 is not limited to storing the velocity data for one frame but may store the velocity data for more than one frame to be read out with a delay of more than one frame. While reference will be made in the following description to an example with a delay of one frame, the present invention applies to the case with a delay of more than one frame in a similar manner. Moreover, the memory 134 is not necessarily a storage device but may be a delay unit having a delay time corresponding to one-frame time or several-frame time. While reference will be made in the following description to an example using a memory, the present invention applies to the case using a delay unit in a similar manner. The one-frame time is, for example, 1/30 seconds.

The pulsation detecting unit 132 detects the pulsation strength in the blood flow rate based on a calculation that employs the velocity data $V_n$ input from the average flow rate calculating unit 126, the velocity data $V_o$ read from the memory 134 and the variance T. The velocity data $V_n$ represents one embodiment of a value of the moving velocity at a current time phase in accordance with the present invention. The velocity data $V_o$ represents one embodiment of a value of the moving velocity at a past time phase in accordance with the present invention. The pulsation detecting unit 132 outputs the detected pulsation strength data P. The pulsation strength data P represents the pulsation strength for each pixel on the acoustic line. The detection of the pulsation strength is achieved as follows.

Figure 9:
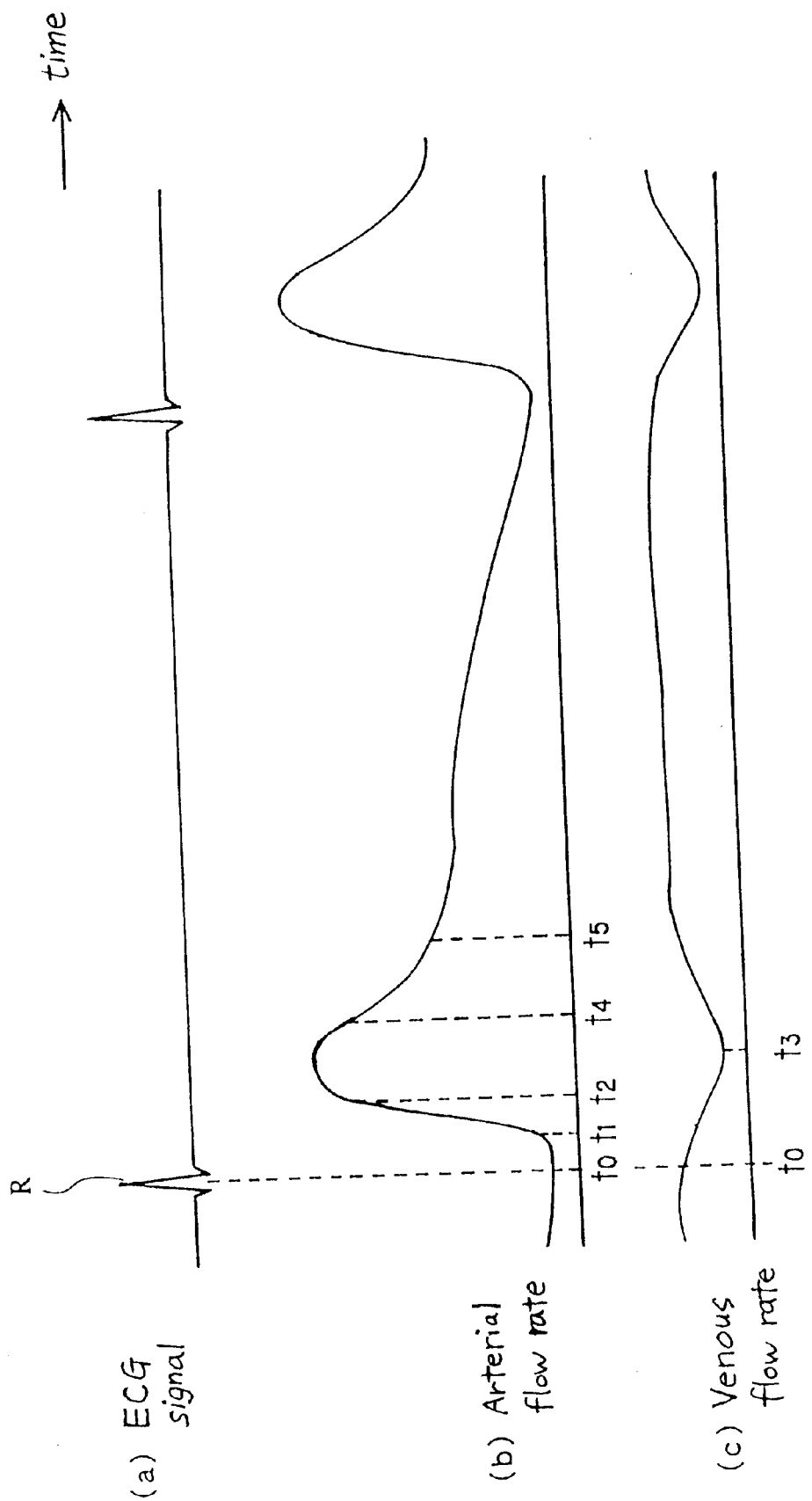
FIG. 9 is a schematic diagram illustrating temporal change in the arterial flow rate and the venous flow rate.

FIG. 9 schematically shows the velocity change in the blood flow with the cardiac pulsation, i.e., the pulsation in the blood flow rate. Graph (a) in FIG. 9 represents the ECG signal, graph (b) represents the arterial flow rate and graph (c) represents the venous flow rate. As shown in (b), the arterial flow rate sharply increases from a time t1 to a time t2 shortly after the occurrence of the R-wave in the ECG signal, quickly decreases after the peak from a time t4 to a time t5 and then gradually decreases in the balance of time: and this change cycle is repeated. With respect to the venous flow rate, the increase of the velocity begins at a time t3 that is later than the time t2, as shown in graph (c), but the increment of the velocity is small.

As the flow rates thus change, so the velocity data $V_n$ changes like (b) or (c). Similarly, the velocity data $V_o$ read from the memory 134 changes with a delay of one-frame time. The velocity data $V_n$ will be referred to as a current velocity $V_n$ and the velocity data $V_o$ will be referred to as a past velocity $V_o$ hereinafter.

The pulsation detecting unit 132 uses these input data to detect the pulsation strength P according to the following equation:

$$P = k \cdot |V_n - V_o|, \quad (1)$$

wherein:

k: constant.

Figure 10:
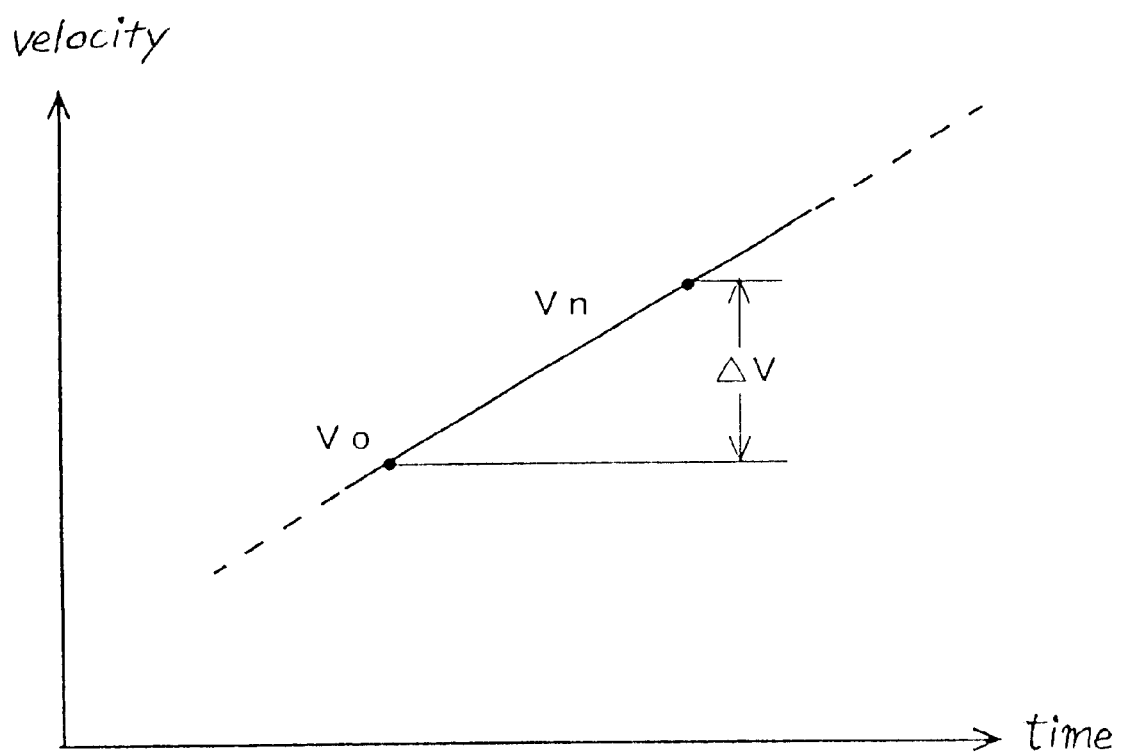
FIG. 10 illustrates the operation of the apparatus shown in FIG. 9.

That is, as schematically shown in FIG. 10, the pulsation strength is detected based on the difference between the current velocity $V_n$ and the past velocity $V_o$. The larger the difference value $\Delta V$, the larger the pulsation strength.

Alternatively, the difference value $\Delta V$ may be divided by the current velocity $V_n$ to detect the pulsation strength P according to the following equation:

$$P = m \cdot \frac{|V_n - V_o|}{V_n}, \quad (2)$$

wherein:

m: constant.

Figure 11:
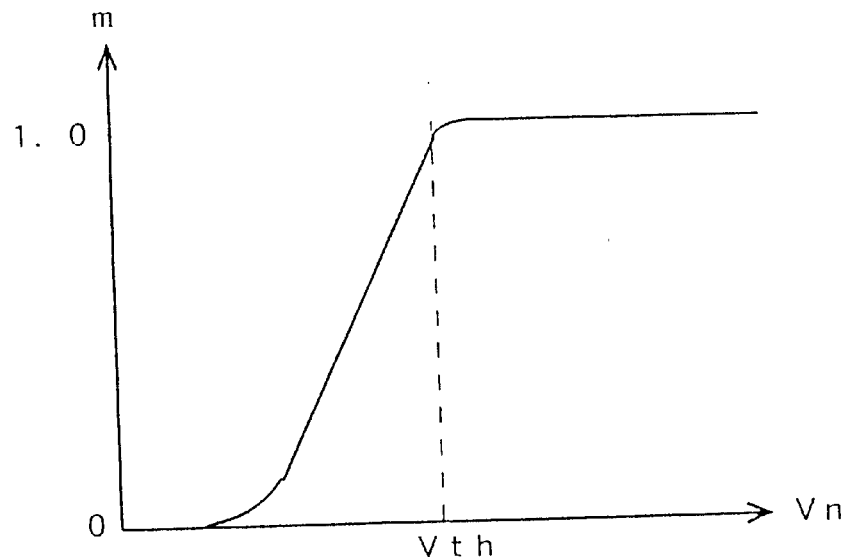
FIG. 11 is a graph illustrating an example of a property of a factor m.

If Equation (2) is used, the pulsation strength P can be conveniently expressed in a normalized form. The constant m may be a variable factor that varies with the current velocity $V_n$, as exemplarily shown in FIG. 11, so that a weight is applied according to the current velocity $V_n$. That is, for a velocity below a predetermined value $V_{th}$, a value of the factor m is decreased to reduce the weight. This can mitigate the pulsation detection sensitivity to the venous blood flow that generally has a small velocity, thereby ensuring that the pulsation of the arterial blood flow is detected. The characteristic curve of the variable factor m is not limited to that shown in FIG. 11 but may be defined properly.

In addition to the calculation according to either one of the above equations, the pulsation detecting unit 132 refers to the variance T to detect the pulsation strength. Since the arterial flow rate has a larger velocity variance than the venous flow rate, more reliable detection of the pulsation strength can be achieved by referring to the variance T. That is, even in the case that the value of P from Eq. (1) or Eq. (2) is large, for example, if the variance T is small the value of P is reduced correspondingly, thereby suppressing the excessive pulsation strength detection.

Reliable pulsation strength detection can also be achieved by utilizing a characteristic feature of the arterial flow rate. That is, as shown in (b) in FIG. 9, the characteristic feature of the arterial flow rate is the sharp velocity increase from the time t1 to the time t2, and hence the pulsation strength detection as described above is done specifically selecting this time period. Because the arterial flow rate has the largest rate of change and the venous flow rate has a gradual change in this time period, the pulsation in the arterial flow rate can be assuredly detected without confusion with the venous flow rate. The period from the time t4 to the time t5 may be used as the pulsation detection time period instead of, or in addition to, the period from the time t1 to the time t2. It should be noted that the time period is specified based on the R-wave timing signal R. Alternatively, time specification may be done based either on the Doppler signal that varies periodically in response to pulsation or on periodic change appeared in the pulsation strength detected by the pulsation detecting unit 132 itself.

In normalizing the pulsation strength P, an average value of the current velocity $V_n$ and the past velocity $V_o$ may be used instead of the current velocity $V_n$. This is preferable in that the detected pulsation strength value P is stabilized against noise or the like. In this case, the factor m is varied according to the average velocity. It should be noted that the average value of the current velocity $V_n$ and the past velocity $V_o$ is determined by the pulsation detecting unit 132.

Moreover, the average velocity may be an average value through one or more cycles of the ECG signal. This is preferable in that the detected pulsation strength value P is further stabilized. In this case, the factor m is varied according to the average velocity. It should be noted that the average through one or more cycles of the ECG signal is determined by the pulsation detecting unit 132. Moreover, the cycle of the ECG signal is detected based on the R-wave timing signal R. Alternatively, the cycle may be detected based either on periodic change in the Doppler shift or on periodic change appeared in the pulsation strength detected by the pulsation detecting unit 132 itself.

The normalization may be done utilizing the maximum velocity through one or more cycles of the ECG signal. This also contributes to stabilization of the detected value P. In this case, the factor m is varied according to the maximum velocity. It should be noted that the maximum velocity through one or more cycles of the ECG signal is determined by the pulsation detecting unit 132.

In the above description, and with respect to the difference value ΔV, the average or maximum value through one or more cycles of the ECG signal may be used instead of, or in addition to, the values at individual time points. This also contributes to stabilization of the detected value P. The average or maximum value through one or more cycles of the ECG signal is determined by the pulsation detecting unit 132.

Similarly, with respect to the variance T to be referred to, the average or maximum value through one or more cycles of the ECG signal may be used instead of, or in addition to, the values at individual time points. This also contributes to stabilization of the detected value P.

Figure 12:
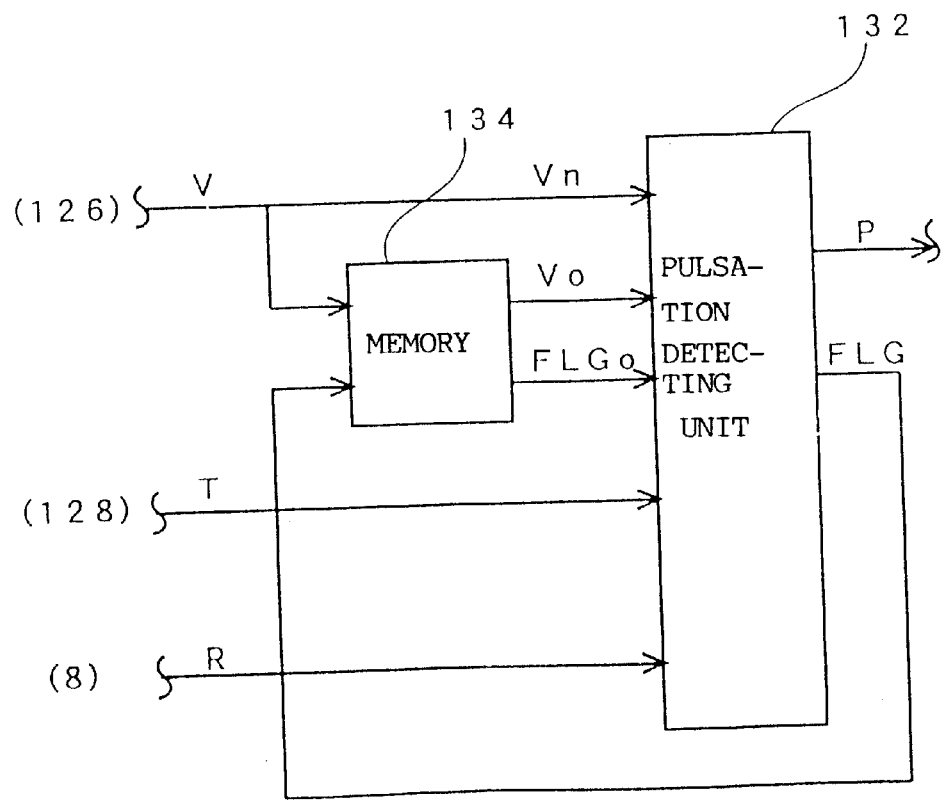
FIG. 12 is a block diagram of part of the Doppler processing section in the apparatus shown in FIG. 1.

The pulsation detecting unit 132 may be configured, as exemplarily shown in FIG. 12, to output a pulsation detection flag FLG as well, and be recursively supplied with the flag via the memory 134 with a delay of one frame so that the pulsation strength is detected also referring to the input flag FLGO. The pulsation detection flag FLG is a signal that indicates whether a pulsation is detected, and the result of the detection for a frame that precedes by one can be referred to by inputting the flag with a delay of one frame.

The pulsation detection flag FLG is used as follows: For example, if a result that denies existence of the pulsation is obtained for a frame that precedes by one, the pulsation that is detected for the current frame may possibly be an error due to noise or the like. Therefore, the pulsation detected for the current frame is invalidated in such a case. This can maintain stability in the pulsation detection.

Figure 13:
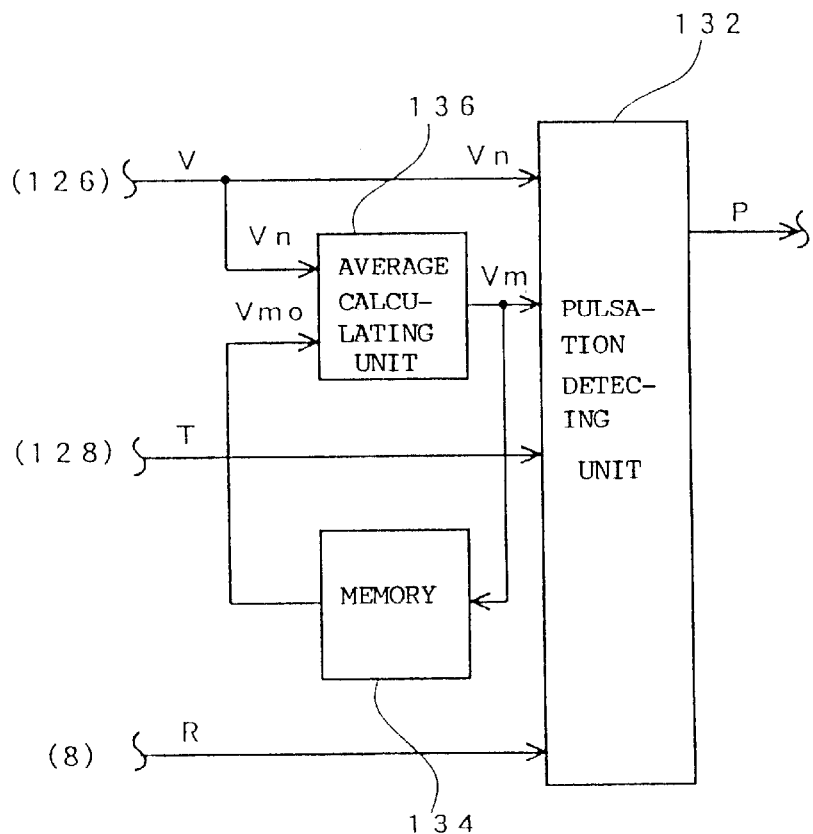
FIG. 13 is a block diagram of part of the Doppler processing section in the apparatus shown in FIG. 1.

The pulsation detecting unit 132 may detect the pulsation strength using the average of the previous velocity values instead of the past velocity $V_o$. FIG. 13 shows an example thus configured. As shown, an average calculating unit 136 is provided to determine an average $V_m$ of the current velocity $V_n$ and an average velocity data $V_{mo}$ until a frame that precedes by one read out from the memory 134, and the determined average is input to the pulsation detecting unit 132. The average $V_m$ is stored in the memory 134 to be read out for the next frame and input to the average calculating unit 136. Therefore, the output data from the average calculating unit 136 is the average of the velocity values for each pixel on the acoustic line detected immediately before the present.

Figure 14:
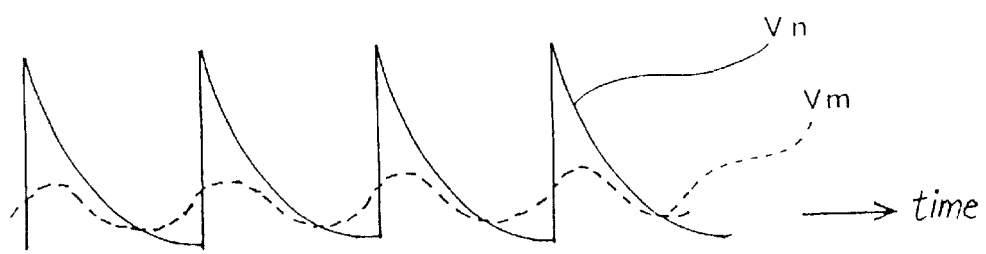
FIG. 14 illustrates the operation of the apparatus shown in FIG. 13.
Figure 15:
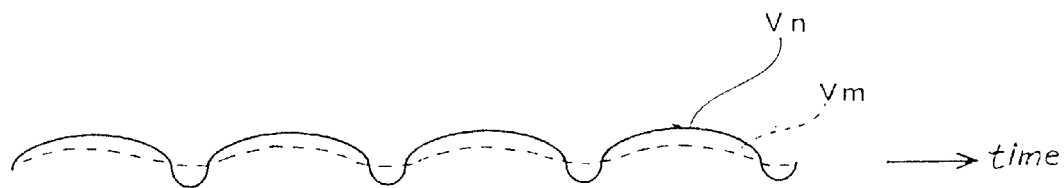
FIG. 15 illustrates the operation of the apparatus shown in FIG. 13.

The pulsation detecting unit 132 detects the pulsation strength by a calculation that employs the velocity data $V_n$, the average $V_m$ and the variance T. An equation for the calculation is the aforementioned Eq. (1) or (2) except that the past velocity $V_o$ is replaced with the average $V_m$. By using the average $V_m$ of the velocity detected until the present as a base for determining the difference value, stable pulsation detection that is not easily affected by noise or the like can be achieved. By such configuration, the difference between $V_n$ and $V_m$ becomes distinct for the arterial blood flow, as exemplarily shown in FIG. 14, thereby facilitating detection of the pulsation strength. Even if the pulsation strength is relatively weak as shown in FIG. 15, the pulsation strength can assuredly be picked up.

It will be recognized that in the case shown in FIG. 13, as in the case shown in FIG. 8, the average or maximum value through one or more cycles of the ECG signal may be employed for the velocity, the difference value and the variance. In addition, it will be recognized that the pulsation detection flag FLG may be recursively input to the pulsation detection unit 132 via the memory 134 to be referred to, following the example shown in FIG. 12.

The B-mode processing section 10 and the Doppler processing section 12 are connected to an image processing section 14. The image processing section 14 represents an embodiment of the image producing means in accordance with the present invention. The image processing section 14 produces a B-mode image, a Doppler image and a pulsation strength image based on the data supplied from the B-mode processing section 10 and the Doppler processing section 12.

Figure 16:
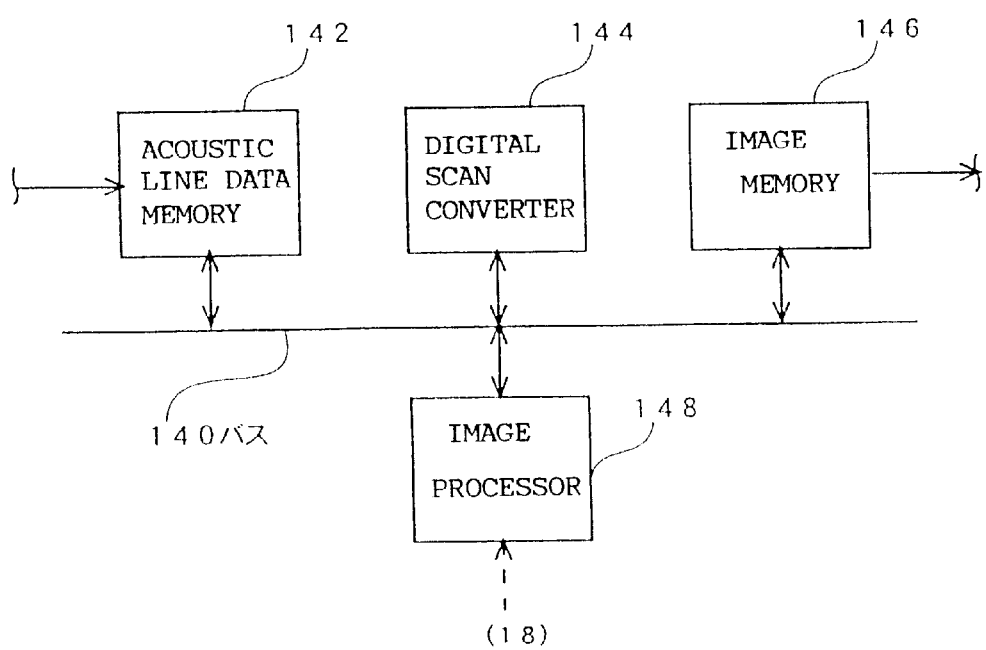
FIG. 16 is a block diagram of the image processing section in the apparatus shown in FIG. 1.

As shown in FIG. 16, the image processing section 14 comprises an acoustic line data memory 142, a digital scan converter 144, an image memory 146 and an image processor 148, all of which are connected by a bus 140.

The B-mode image data and the Doppler image data respectively input from the B-mode processing section 10 and the Doppler processing section 12 for each acoustic line are separately stored in the acoustic line data memory 142. Respective acoustic line data spaces composed of these image data are then formed in the acoustic line data memory 142. The digital scan converter 144 converts the data in the acoustic line data space into data in a physical space by scan conversion. The acoustic line data space is thus converted into the physical data space. The image data converted by the digital scan converter 144 is stored in the image memory 146. The image processor 148 performs a predetermined data processing on the data in the acoustic data memory 142 and on the data in the image memory 146. Detailed description of the data processing will be made later.

The image processing section 14 is connected with a display section 16. The display section 16 represents one embodiment of the display means in accordance with the present invention. The display section 16 is configured to be supplied with an image signal from the image processing section 14 and display an image based on the supplied signal. It should be noted that the display section 16 is comprised of a graphic display or the like capable of displaying a color image.

The transceiver section 6, the B-mode processing section 10, the Doppler processing section 12, the image processing section 14 and the display section 16 are connected with a control section 18. The control section 18 supplies control signals to these sections to control their operation. Moreover, the control section 18 is supplied with several information signal from the controlled sections.

Under the control of the control section 18, the B-mode operation and the Doppler mode operation are executed. The control section 18 is connected with an operating section 20. The operating section 20 is operated by the operator inputting appropriate commands and information to the control section 18. The operating section 20 is comprised of an operating panel including, for example, a keyboard and the other operating devices.

Now the operation of the present apparatus will be described. The operator puts the ultrasonic probe 2 against a desired portion in the subject 4 and operates the operating section 20 to execute an imaging operation, for example, in the combined B mode and Doppler mode. Then the B-mode imaging and the Doppler mode imaging are executed in a time-shared manner under the control of the control section 18. For example, a combined scan in the B mode and the Doppler mode is performed in a proportion of several Doppler mode scans per B-mode scan.

In the B mode, the transceiver section 6 receives individual echoes by scanning the internal of the subject 4 in an acoustic-line-sequential manner via the ultrasonic probe 2. The B-mode processing section 10 logarithmically amplifies the echo receive signal input from the transceiver section 6 at the logarithmic amplifier unit 102, detects its envelope at the envelope detector unit 104 to generate an A-scope signal, and generates B-mode image data for each acoustic line based on the A-scope signal. The image processing section 14 stores the B-mode image data for each acoustic line input from the B-mode processing section 10 into the acoustic line data memory 142. An acoustic line data space for the B-mode image data is thus formed in the acoustic line data memory 142.

In the Doppler mode, the transceiver section 6 receives individual echoes by scanning the internal of the subject 4 in an acoustic-line-sequential manner via the ultrasonic probe 2. At this time, a plurality of times of ultrasound transmission and echo reception are executed per acoustic line. The Doppler processing section 12 quadrature-detects the echo receive signal at the quadrature detector unit 120, MTI-processes the signal at the MTI filter 122, calculates an autocorrelation at the autocorrelation calculating unit 124, and, from the result of the autocorrelation, determines an average flow rate at the average flow rate calculating unit 126, a variance at the variance calculating unit 128 and a power at the power calculating unit 130. Moreover, the pulsation strength is determined by the pulsation detecting unit 132 as described above. These determined values respectively constitute image data representing, for example, the average velocity of the blood flow etc., its variance, the power of the Doppler signal and the pulsation strength of the blood flow etc., for each acoustic line and for each pixel. It should be noted that the MTI processing at the MTI filter 122 is performed using a plurality of echo receive signals per acoustic line.

The image processing section 14 stores these Doppler image data for each acoustic line and for each pixel input from the Doppler processing section 12 into the acoustic line data memory 142. Respective acoustic line data spaces for the Doppler image data are thus formed in the acoustic line data memory 142. The image processor 148 scan-converts the B-mode image data and the Doppler image data in the acoustic line data memory 142 at the digital scan converter 144 and writes these data into the image memory 146.

At this time, the Doppler image data is written separately as CFM image data that incorporates the variance with the velocity, power Doppler image data, and pulsation strength image data. Alternatively, the Doppler image data may be written as CFM-like image data that incorporates the pulsation strength with the velocity. Moreover, the Doppler image data may be written as power Doppler-like image data that incorporates the pulsation strength with the power Doppler image data.

The image processor 148 writes the B-mode image data, the CFM image data, the power Doppler image data, the pulsation strength image data, the CFM-like image data and the power Doppler-like image data into separate areas in the image memory 146. The B-mode image represents a tomographic image of the internal tissue in an acoustic line scan plane. The CFM image is an image that indicates two-dimensional distribution of the blood flow rate etc. in the acoustic line scan plane. In the CFM image, the display color is varied according to the direction of the blood flow. In addition, the brightness of the display color is varied according to the velocity. Furthermore, the purity of the display color is varied by increasing the mixing proportion of a predetermined color according to the variance.

The power Doppler image is an image that indicates existence of the blood flow etc. in the acoustic line scan plane. In the power Doppler image, the display color is monochrome because the directions of the blood flow are not discriminated. However, the display color is different from the color used for the CFM image. The brightness of the display color is varied according to the signal strength. This image substantially represents the blood vessel or the like.

The pulsation strength image is an image that represents two-dimensional distribution of the pulsation strength of the blood flow etc. in the acoustic line scan plane. The pulsation strength image is displayed in one color. The display color is different from the colors used the CFM image and the power Doppler image. The brightness of the display color is varied according to the pulsation strength. By constructing the pulsation strength image based on the instantaneous values of the pulsation strength, an image that represents change in the pulsation strength in real time can be obtained. By constructing the pulsation strength image based on the temporal average values of the pulsation strength, an image that represents smoothed change in the pulsation strength can be obtained. By constructing the pulsation strength image based on the peak-hold values of the pulsation strength, the pulsation strength can be displayed as an image having mild appearance with little flickers. The peak-hold value may be one which attenuates with time.

When the pulse strength image is produced as the CFM-like image or as the power Doppler-like image, the purity of the display color for the velocity or for the power is varied according to the pulsation strength. However, the blended color is changed so as to clearly differentiate the velocity or the power from the variance.

In displaying these images on the display section 16, the B-mode image and the CFM image, for example, are superimposed. This allows the operator to observe a blood flow rate distribution image clarifying the positional relationship with the internal tissue. Moreover, the B-mode image and the power Doppler image are superimposed. This allows the operator to observe the run of the blood vessel clarifying the positional relationship with the internal tissue.

Furthermore, the B-mode image and the pulsation strength image are superimposed. This allows the operator to observe the run of the artery clarifying the positional relationship with the internal tissue, thereby allowing the operator to visually determine whether a blood vessel in the ROI is arterial at once. Especially when the display is performed using the CFM-like image or the power Doppler-like image, the velocity distribution and the velocity pulsation strength or the flowing echo source distribution and the velocity pulsation strength can be visually observed all in one.

By moving the ultrasonic probe 2 in a direction, for example, orthogonal to the acoustic line scan plane, the internal of the subject 4 can be scanned in a three-dimensional manner. In this case, an MIP (maximum intensity projection) technique, for example, is applied to the image data of the kinds described above in the three-dimensional space obtained from the three-dimensional scan to provide respective three-dimensional images. These images are then displayed on the display section 16 to achieve three-dimensional display of the pulsation strength etc.

While reference is made in the foregoing description to an example for displaying the arterial blood flow based on the pulsation strength, it will be easily recognized that the venous blood flow may be displayed by using the flow velocity having a small pulsation strength. Therefore, it is obvious that the venous blood flow can be displayed instead of, or in addition to, the arterial blood flow.

Many widely different embodiments of the invention may be configured without departing from the spirit and the scope of the present invention. It should be understood that the present invention is not limited to the specific embodiments described in the specification, except as defined in the appended claims.

What is claimed is:

1. An ultrasonic imaging apparatus comprising:
ultrasonic transmitting/receiving means for repeatedly scanning an imaging range with an ultrasound and receiving an echo;
velocity detecting means for detecting a moving velocity of an echo source based on a Doppler shift in a received echo;
pulsation detecting means for detecting a pulsation strength in the moving velocity by a calculation that employs a value of the moving velocity at a current time phase and a value of the moving velocity at a past time phase;
image producing means for producing an image representing the detected pulsation strength;
B-mode image producing means for producing a B-mode image based on the received echo; and
display means for superimposing the B-mode image and the image representing the pulsation strength.

2. An ultrasonic imaging apparatus comprising:
ultrasound transmitting/receiving means for repeatedly scanning an imaging range with an ultrasound and receiving an echo;
velocity detecting means for detecting a moving velocity of an echo source based on a Doppler shift in a received echo;
pulsation detecting means for detecting a pulsation strength in the moving velocity by a calculation that employs a value of the moving velocity at a current time phase and a value of the moving velocity at a past time phase;
image producing means for producing an image representing the detected pulsation strength;
velocity image producing means for producing an image representing the moving velocity; and
display means for superimposing the velocity image and the image representing the pulsation strength.

3. An ultrasonic imaging apparatus comprising:
ultrasonic transmitting/receiving means for repeatedly scanning an imaging range with an ultrasound and receiving an echo;
velocity detecting means for detecting a moving velocity of an echo source based on a Doppler shift in a received echo;
pulsation detecting means for detecting a pulsation strength in the moving velocity by a calculation that employs a value of the moving velocity at a current time phase and a value of the moving velocity at a past time phase;
image producing means for producing an image representing the detected pulsation strength;
power Doppler image producing means for producing a power Doppler image representing a power of the Doppler shift signal; and
display means for superimposing the power Doppler image and the image representing the pulsation strength.

4. The apparatus of claim 1, 2 or 3, further comprising:
means for determining an average or maximum velocity value for the moving velocity through a pulsation cycle(s) of the heart; and
difference generating means for determining a difference value between a value of the moving velocity at a current time phase and a value of the moving velocity at a past time phase; wherein
said pulsation detecting means detects the pulsation strength in the moving velocity by calculation that employs the average or maximum velocity value and the difference value.

5. The apparatus of claim 1, 2, or 3, wherein the pulsation detecting means performs the calculation employing a difference or average value between the value of the moving velocity at the current time phase and the value of the moving velocity at the past time phase.

6. The apparatus of claim 1, 2 or 3, further comprising:
variance detecting means for detecting a variance of the moving velocity; and wherein
the pulsation detecting means performs the calculation employing the variance detected by the variance detecting means.

7. The apparatus of claim 1, 2 or 3, wherein the pulsation detecting means outputs the result of the calculation in a specific time period in a pulsation cycle(s) of the heart.

8. The apparatus of claim 1, 2 or 3, further comprising:
electrocardiographic (ECG) signal detecting means for detecting an ECG signal of an imaging object; and wherein the pulsation detecting means determines a specific time period or pulsation cyle(s) based on the detected ECG signal.

9. The apparatus of claim 1, 2 or 3, further comprising:
variance detecting means for detecting a variance of the moving velocity; and
means for determining an average or maximum variance value for the variance through a pulsation cycle(s) of the heart; and wherein
the pulsation detecting means performs the calculation employing the average or maximum variance value.

10. The apparatus of claim 1, 2 or 3, wherein the pulsation detecting means performs the calculation employing a value of a difference value or variance at the current time phase.

11. The apparatus of claim 1, 2 or 3, wherein the pulsation detecting means determins the pulsation cycle based on periodic change in a Doppler shift or in the pulsation strength.

12. The apparatus of claim 1, 2 or 3, wherein the pulsation detecting means determines the pulsation cycle based only on the periodic change in the pulsation strength.

13. The apparatus of claim 1, 2 or 3, whreein the pulsation detecting means performs calculation employing only an outut signal at the past time phase.

14. The apparatus of claim 1, 2 or 3, wherein the image producing means produces an image based on an instantaneous, temporal average or peak hold value of the pulsation strength.

15. The apparatus of claim 1, 2 or 3, further comprising display means for displaying an image representing the pulsation strength as a three dimensional image.

16. The apparatus of claim 1, 2 or 3, wherein the pulsation detecting means performs calculation employing a value of the moving velocity at a current time phase and an average value for the moving velocity from a past time phase to the current time phase.

17. The apparatus of claim 1, 2 or 3, further comprising a difference averaging means for determining an average difference value for the difference value through a pulsation cycle(s) of the heart; and wherein said pulsation detecting means performs calculation that employs the average velocity value and the average difference value.

18. The apparatus of claim 1, 2 or 3, further comprising a maximum differrence detecting means for determining a maximum difference value for the difference value through a pulsation cycle(s) of the heart; and wherein the pulsation detecting means performs calculation that employs the maximum velocity and the maximum difference value.

19. An ultrasonic method comprising the steps of:

repeatedly scanning an image range with an ultrasound and receiving an echo;

detecting a moving velocity of an echo source based on a Doppler shift in a received echo and detecting a pulsation strength in the moving velocity by a calculation that employs a value of the moving velocity at a current time phase and a value of the moving velocity at a past time phase; and producing a combined image comprising an image representing the received echo, and an image representing the detected pulsation strength.

20. An ultrasonic imaging apparatus comprising:

ultrasound transmit/receive means for repeatedly scanning an imaging range with an ultrasound and receiving an echo;

velocity detecting means for detecting a moving velocity of an echo source based on a Doppler shift in a received echo;

pulsation detecting means for detecting a pulsation strength in the moving velocity by a calculation that employs a value of the moving velocity at a current time phase and a value of the moving velocity at a past time phase; and image producing means for producing a combined image comprising an image representing the received echo and an image representing the detected pulsation strength.

21. The apparatus of claim 20, further comprising means for determining an average or maximum velocity value for the moving velocity through a pulsation cycle(s) of the heart;

and difference generating means for determining a difference value between a value of the moving velocity at a current time phase and a value of the moving velocity at a past time phase; wherein said pulsation detecting means detects the pulsation strength in the moving velocity by a calculation that employs the average or maximu velocity value and the difference value.

* * * * *